United States Patent
Ogura et al.

Patent Number: 6,111,647
Date of Patent: Aug. 29, 2000

[54] DETECTION OF FOCAL POINT OF OBJECTIVE LENS BY MEANS OF A TWO-SPLIT SENSOR

[75] Inventors: Yukio Ogura; Katsunori Nagamatsu; Shingo Murakami, all of Tokyo, Japan

[73] Assignee: NEC Corporation, Tokyo, Japan

[21] Appl. No.: 09/294,375

[22] Filed: Apr. 20, 1999

[30] Foreign Application Priority Data

Apr. 22, 1998 [JP] Japan ................ 10-112171

[51] Int. Cl.$^7$ ............................ G01B 11/14
[52] U.S. Cl. ........................ 356/375; 256/201.4
[58] Field of Search .................... 356/125, 375; 250/201.4, 201.6, 201.8

[56] References Cited

U.S. PATENT DOCUMENTS

| | | | |
|---|---|---|---|
| 3,969,575 | 7/1976 | Gerritsen et al. | 356/125 |
| 4,548,495 | 10/1985 | Suzuki | 356/123 |
| 4,630,927 | 12/1986 | Fulkerson | 356/375 |
| 4,843,228 | 6/1989 | Nakamura . | |
| 4,897,536 | 1/1990 | Miyoshi . | |

FOREIGN PATENT DOCUMENTS

| | | |
|---|---|---|
| 60-234236 | 11/1985 | Japan . |
| 61-229241 | 10/1986 | Japan . |
| 61-282809 | 12/1986 | Japan . |
| 62-143235 | 6/1987 | Japan . |
| 3-84913 | 8/1991 | Japan . |
| 4-3335 | 1/1992 | Japan . |
| 5-312510 | 11/1993 | Japan . |
| 8-161761 | 6/1996 | Japan . |
| 9-127421 | 5/1997 | Japan . |

*Primary Examiner*—Richard A. Rosenberger
*Attorney, Agent, or Firm*—Sughrue, Mion, Zinn, Macpeak & Seas, PLLC

[57] ABSTRACT

A focal point detecting apparatus for an objective lens is disclosed for inspecting whether or not the focal point of the objective lens used in an electron microscope, an optical inspecting apparatus, a laser processing apparatus, etc. is positioned on a surface of a target object. The focal point detecting apparatus comprises for entering an optical beam for detecting a focal point from a position deviant from an optical axis of an objective lens to a surface of a target object to be inspected through at least the objective lens; and two two-split sensors on which the optical beam reflected from the surface of the target object so as to pass again through the objective lens is converged by at least a condenser lens. The two two-split sensors are arranged at the same optical inclination in front of and behind the position on which the reflected optical beam is converged by the condenser lens when the focal point of the objective lens is positioned on the surface of the target object.

10 Claims, 9 Drawing Sheets

DETECTION OF FOCAL POINT OF OBJECTIVE LENS BY MEANS OF A TWO-SPLIT SENSOR

BACKGROUND OF THE INVENTION

1. Field of the Invention

The present invention relates to a focal point detecting apparatus for use in an electron microscope, an optical inspecting apparatus, a laser processing apparatus, etc. for detecting whether or not the focal point of an objective lens is positioned on a surface of a target object to be inspected.

2. Description of the Related Art

Heretofore, there has been proposed a focal point detecting apparatus employing a so-called "skew method" in which an optical beam for the focal point detection is entered from a position which is not on the optical axis of the objective lens in the optical system to the objective lens. In this method, a two-split sensor is positioned on the focal point of a condenser lens and a focus signal is obtained from a difference between two output signals generated from two light receiving elements constituting the two-split sensor.

An optical system in the conventional focal point detecting apparatus employing the skew method will be described in detail with reference to FIG. 1. As shown in the drawing, an objective lens 1 and a condenser lens 5 have an optical axis in common. A semitrasparent mirror 3 (or a polarization mirror) is arranged between objective lens 1 and condenser lens 5, and a two-split sensor 6 is arranged at the focal point of condenser lens 5.

An optical beam 2 for detecting the focal point from a position deviant from the optical axis 1a of objective lens 1 enters semitrasparent mirror 3 (or polarization mirror). Optical beam 2 reflected from semitrasparent mirror 3 passes through objective lens 1 to be converged on a surface 4 of a target object to be inspected. Then, optical beam 2 reflected from surface 4 of the target object enters again objective lens 1 and passes through semitrasparent mirror 3 to be converged on two-split sensor 6 by condenser lens 5.

FIGS. 2A to 2C show the converged states of the optical beam on two-split sensor 6. A deviation of a beam 7 returning to the two-split sensor 6 on the side of a light receiving element 6A of the two-split sensor as shown in FIG. 2A, shows that surface 4 of the target object is positioned farther away from the focal point of objective lens 1.

The positioning of beam 7 returning to two-split sensor 6 equally on both of light receiving element 6A and a light receiving element 6B as shown in FIG. 2B, shows that surface 4 of the target object is positioned on the focal point of objective lens 1.

Further, a deviation of beam 7 returning to two-split sensor 6 on the side of light receiving element 6B of the two-split sensor as shown in FIG. 2C, shows that surface 4 of the target object is positioned closer to objective lens 1 than the focal point of objective lens 1.

Thus, the calculation of the difference in the output between the light receiving elements 6A and 6B of two-split sensor 6 makes it possible to detect surface 4 of the target object relative to the focal point of objective lens 1.

To this end, a signal processing circuit 8 is provided to compare the output signals from the light receiving elements 6A and 6B. Signal processing circuit 8 carries out F=a−b, where a and b represent output signals from the light receiving elements 6A and 6B, respectively.

FIG. 3 is a graph showing a variation in an output signal F from signal processing circuit 8 as surface 4 of the target object is moved along the direction of the optical axis of objective lens 1. In the graph of FIG. 3, the abscissa denotes a position of objective lens 1 relative to the focal point of objective lens 1. The larger the position from the origin becomes in the negative direction, the farther the surface 4 of the target object is positioned from the focal point of the objective lens 1. On the other hand, the larger the position from the origin becomes in the positive direction, the closer surface 4 of the target object is positioned to objective lens 1 than the focal point of objective lens 1. A curve 9 in FIG. 3 represents a difference signal F, which is a focus signal at the time when the light amount of return beam 7 is uniformly distributed about the optical axis of the return beam. As seen from FIG. 3, when the focal point of objective lens 1 deviates from surface 4 of the target object, objective lens 1 is moved along the direction of the optical axis such that the value of the focus signal F becomes zero, thus constantly making the focal point of objective lens 1 coincide with surface 4 of the target object.

The aforementioned conventional apparatus does not pose a serious problem when the light amount distribution of the return beam to two-split sensor 6 is substantially uniform about the optical axis. However, the light amount distribution of the return beam to two-split sensor 6 can not be uniform about the optical axis in the case of the surface of a target object having a large local difference in reflectance due to a wiring pattern depicted with chromium on a glass substrate like a semiconductor mask, or the surface of the target object having a difference in reflectance due to asperities thereof like a semiconductor wafer coated with resist, exposed, and then developed. Consequently, a desired focus signal cannot be obtained, causing a misoperation when the focus of the objective lens is adjusted on the surface of the target object.

SUMMARY OF THE INVENTION

It is an object of the present invention to provide a focal point detecting apparatus with a high accuracy which is always capable of obtaining a good focus signal without regard to a local difference in reflectance on the surface of a target object to be inspected.

According to one aspect of the present invention, an optical beam for detecting a focal point enters from a position deviant from an optical axis of an objective lens to a surface of a target object through the objective lens. The optical beam reflected from the surface of the target object passes through the objective lens, and then, is converged at least by a condenser lens onto a two-split sensor. Two two-split sensors are arranged with the same optical inclination before and after the position at which the optical beam reflected from the surface of the target object is converted by the condenser lens when the focal point of the objective lens is positioned on the surface of the target object.

In another aspect of the present invention, the optical beam reflected from the surface of the target object passes again through the objective lens, and then, is branched into two directions by a branching means. One branched optical beams is converged by a first condenser lens on a first two-split sensor. The other branched optical beam is converged by a second condenser lens on the first two-split sensor. The first two-split sensor is arranged in front of the position at which one of the branched optical beam is converged by the first condenser lens when the focal point of the objective lens is positioned on the surface of the target object. On the other hand, a second two-split sensor is arranged rearward of the position at which the other branched optical beam is converged by the second condenser lens when the focal point of the objective lens is positioned on the surface of the target object.

Each of first and second two-split sensors comprises two light receiving sections. A boundary line between the two light receiving sections may preferably make an angle of about 45° relative to the moving direction of the optical beam on the two-split sensor when the target object is moved along the direction of the optical axis of the objective lens.

A focal point detecting apparatus according to the present invention may preferably comprise a signal processing circuit which generates an output signal F=(a1−a2)−(b2−b1), where a1 and a2 represent the output signals from the two light receiving sections of a first two-split sensor, b1 the output signal from that light receiving section of a second two-split sensor at a position optically equivalent to that of the light receiving section generating the output signal a1, and b2 the output signal from that light receiving section of the second two-split sensor which is in a position optically equivalent to that of the light receiving section generating the output signal a2.

The present invention makes it possible to always obtain a satisfactory focus signal generated from the signal processing circuit without regard to the local difference due to asperities on the surface of the target object. As a result, the focal point of the objective lens can be constantly positioned on the surface of the target object regardless of the condition on the surface of the target object when moving the objective lens such that the obtained focus signal may coincide with a value under the state being in focus.

The above and other objects, features and advantages of the present invention will become apparent from the following description with reference to the accompanying drawings which illustrate examples of the present invention.

DETAILED DESCRIPTION OF THE PREFERRED EMBODIMENTS OF THE INVENTION

Figure 1:
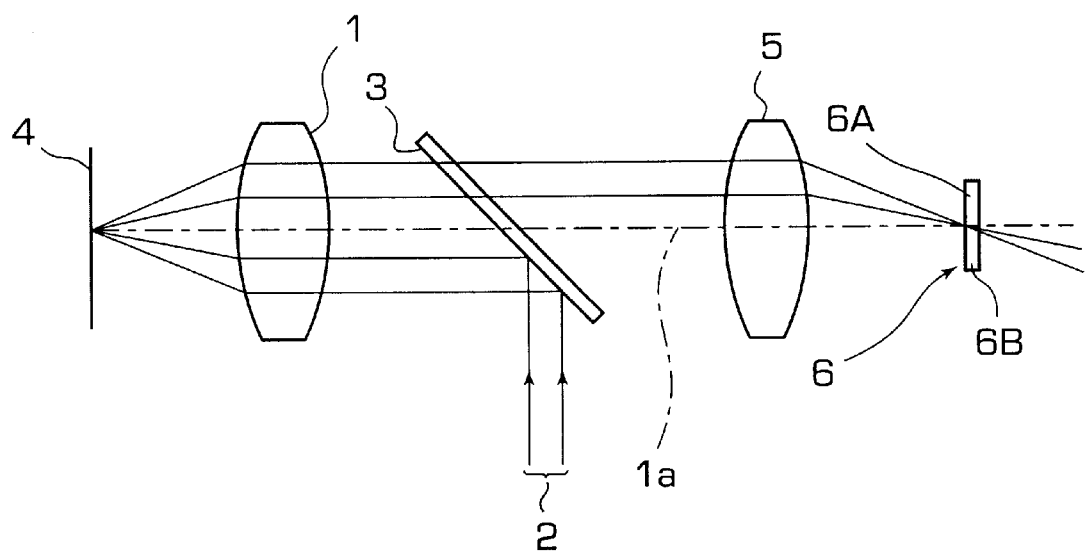
FIG. 1 schematically shows an optical system of a conventional focal point detecting apparatus using a skew method.
Figure 2A:
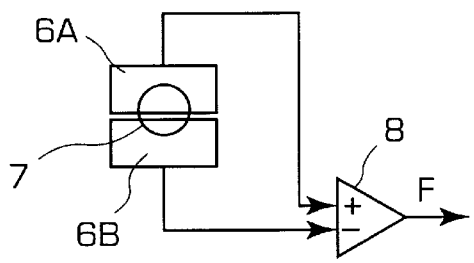
FIGS. 2A to 2C show the converged state of light on a two-split sensor in the focal point detecting apparatus shown in FIG. 1.
Figure 2B:
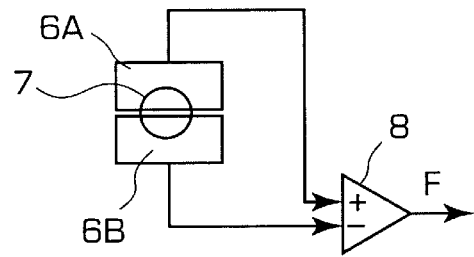
Figure 2C:
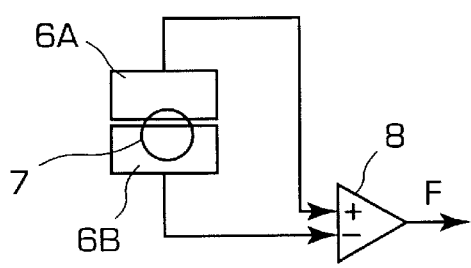
Figure 3:
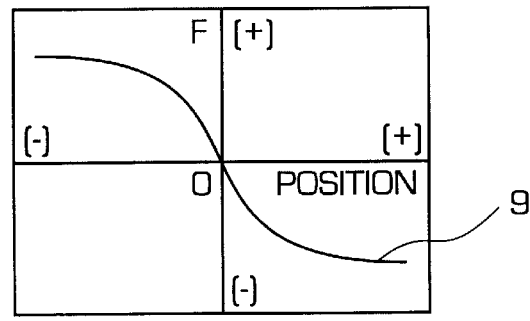
FIG. 3 is a graph showing a variation of a signal generated from a signal processing circuit shown in FIGS. 2A to 2C as a surface of a target object is moved along the direction of an optical axis of the objective lens.
Figure 4:
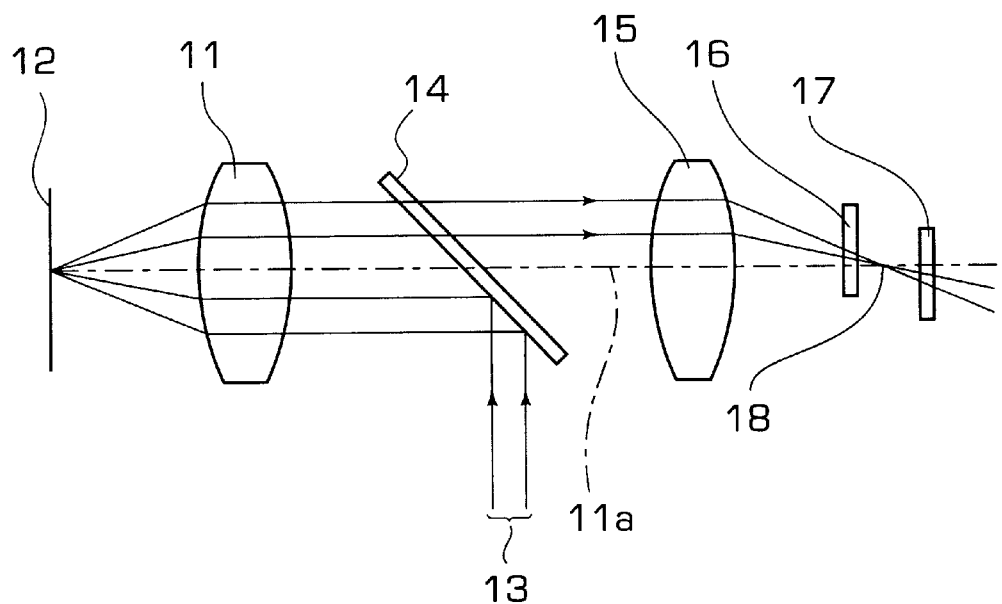
FIG. 4 schematically shows an optical system of a focal point detecting apparatus according to an embodiment of the present invention.

Referring now to FIG. 4, there is shown an optical system in a focal point detecting apparatus according to one embodiment of the present invention, which is used as a part of an apparatus for performing an optical measurement or processing by positioning a focal point of an objective lens 11 on a surface 12 of a target object. Objective lens 11 and a condenser lens 15 have an optical axis in common. A beam splitter (semitrasparent mirror) 14 is located between objective lens 11 and condenser lens 15. A polarization mirror may be used in place of beam splitter 14. An optical beam 13 to detect the focal point of objective lens 11 enters from a position deviant from an optical axis 11a of objective lens 11 into objective lens 11 through beam splitter 14. Optical beam 13 used for the detection of the focal point, which has passed through objective lens 11, is converged in the vicinity of surface 12 of the target object. Then, optical beam 13 (return beam) reflected from surface 12 of the target object enters again into objective lens 11, and then passes through beam splitter 14. The return beam passing through beam splitter 14 is converged by condenser lens 15. First and second two-split sensors 16 and 17 are located before and after the light converging position 18 at which the return beam is converged by condenser lens 15 when the focal point of objective lens 11 is positioned on surface 12 of the target object. These two-split sensors 16 and 17 may preferably be positioned equidistantly from the light converging position 18.

Figure 5:
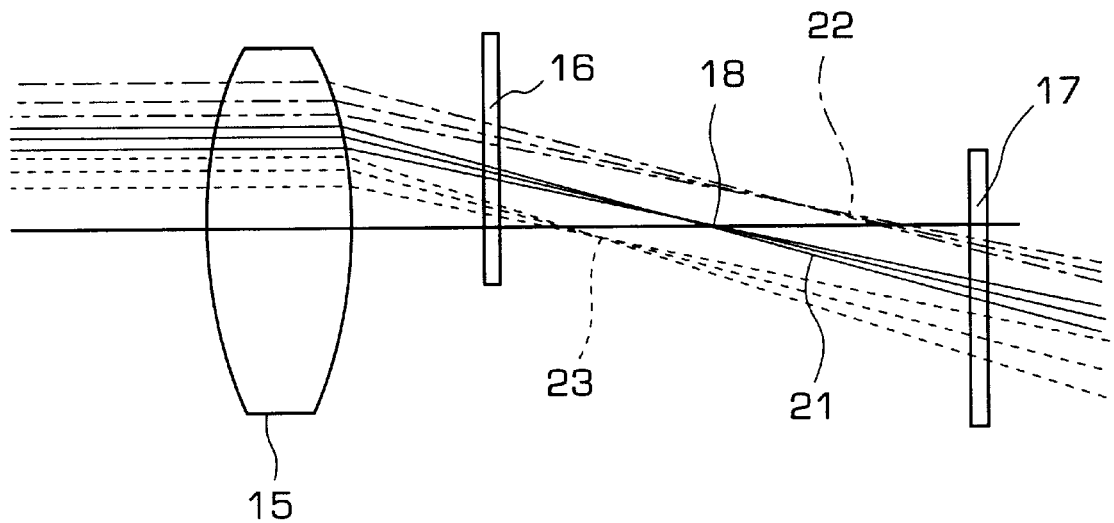
FIG. 5 shows how the return beam of an optical beam for the focal point detection is focused by a condenser lens when the focal point of the objective lens is deviated from the surface of the target object in the focal point detecting apparatus shown in FIG. 4.

FIG. 5 shows how the return beam of optical beam 13 for the focal point detection is focused by condenser lens 15 when the focal point of objective lens 11 is not positioned on surface 12 of the target object. An optical beam 21 denoted by a solid line in FIG. 5 represents a return beam when the focal point of objective lens 11 is positioned on surface 12 of the target object. In this case, the return beam is focused on position 18 by condenser lens 15. An optical beam 22 shown in FIG. 5 represents a return beam when surface 12 of the target object shown in FIG. 4 is positioned farther from objective lens 11 than the focal point of objective lens 11. An optical beam 23 shown in FIG. 5 represents a return beam when surface 12 of the target object shown in FIG. 4 is moved from the focal point of objective lens 11 toward objective lens 11. As shown in FIG. 5, the optical beams 22 and 23 do not cross each other in the vicinity of the light converging position 18 at which optical beam 21 is converged by condenser lens 15. Also, each of the optical beams 21, 22 and 23 is turned by 180° to reverse the up-down and right-left positions by the light converging function of the lens in the vicinity of the light converging position of condenser lens 15.

Figure 6A:
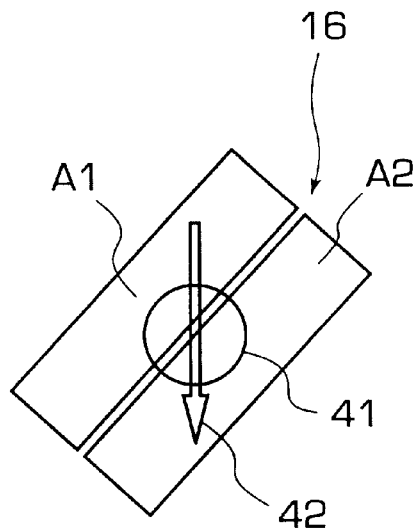
FIGS. 6A and 6B show the movement of the return beam of an optical beam for the focal point detection on the two-split sensors when the surface of the target object is moved along the optical axis of the objective lens in the focal point detecting apparatus shown in FIG. 4.
Figure 6B:
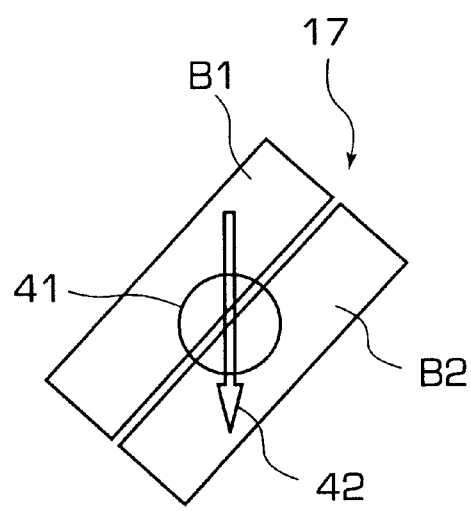

The return beam of the optical beam for the focal point detection is moved depending on the deviation of the focal point of objective lens 11 from the surface 12 of the target object, as optical beams 21, 22, 23 shown in FIG. 5. Each of FIGS. 6A and 6B shows the movement of the return beam on the two-split sensor when surface 12 of the target object is moved along the direction of the optical axis of objective lens 11 toward objective lens 11. When the surface 12 of the target object is moved along the direction of the optical axis of objective lens 11 toward the objective lens 11, a return beam 11 converged on each of the two-split sensors 16 and 17 is moved as denoted by an arrow in FIG. 6A and 6B. The moving direction forms an angle of about 45° relative to the boundary line between two light receiving sections constituting each of the two-split sensors 16 and 17. Namely, two-split sensors 16 and 17 are arranged in the optically same direction such that the boundary line between the two light receiving sections constituting each of these two-split sensors 16 and 17 forms an angle of about 45° relative to the moving direction of return beam 41. Two light receiving sections A1 and A2 (or B1 and B2) constituting two-split sensor 16 (or 17) are formed in symmetry with respect to the boundary line therebetween. Also, the light receiving section A1 of two-split sensor 16 and the light receiving section B1 of other two-split sensor 17 are in the optically equivalent positions. Similarly, the light receiving section A2 and the light receiving section B2 are also in the optically equivalent positions.

It should be noted that the center of the boundary line between the two light receiving sections in each of the two-split sensors 16 and 17 lies on the central line of the optical beam 21 when the focal point of objective lens 11 is positioned on surface 12 of the target objective, as shown in FIGS. 4 and 5.

Figure 7:
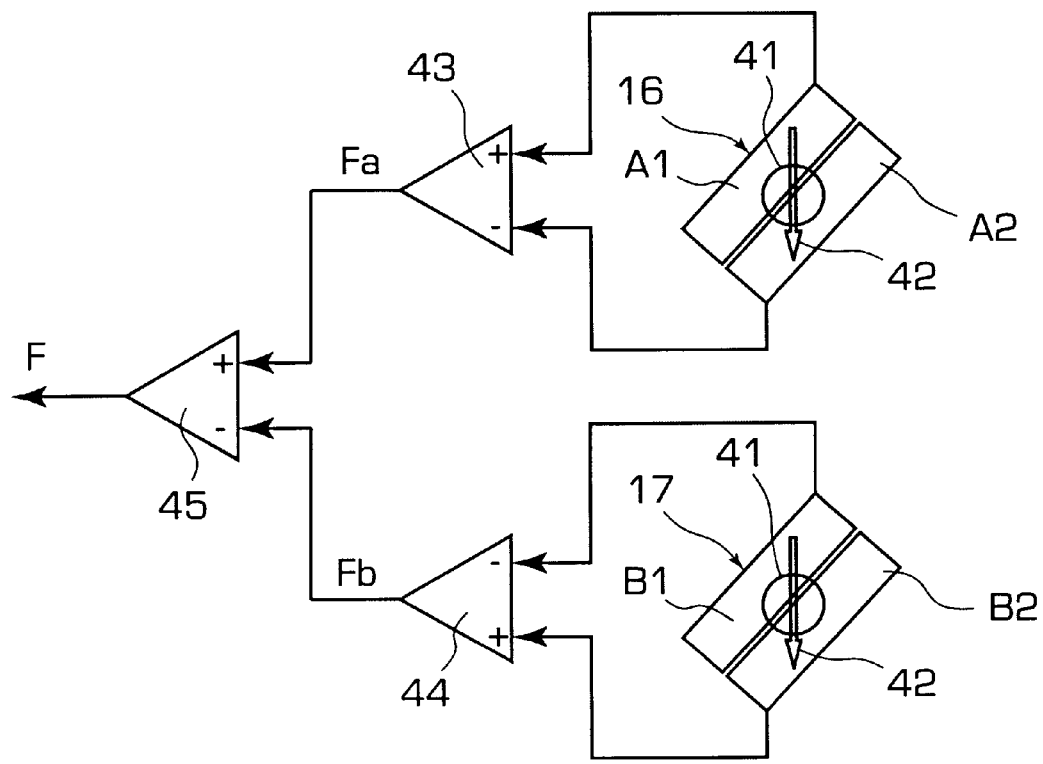
FIG. 7 shows a signal processing circuit for processing the output signals generated from the two-split sensors shown in FIGS. 4, 5, 6A and 6B.

FIG. 7 shows a signal processing circuit for processing the output signals from the two-split sensors 16 and 17 shown in FIGS. 4 to 6. The signal processing circuit shown in FIG. 7 comprises differential amplification circuits 43, 44 and 45. Differential amplification circuits 43 receives at its non-inverting terminal, the output signal a1 from the light receiving section A1 in two-split sensor 16, and at its inverting terminal the output signal a2 from the light receiving section A2 of two-split sensor 16, and produces an output signal Fa=a1−a2. Similarly, differential amplification circuit 44 produces an output signal Fb=b2−b1, where b1 and b2 represent the output signals from the light receiving sections B1 and B2, respectively, of the two-split sensor 17. Finally, differential amplification circuits 45 produces an output signal F=Fa−Fb=(a1−a2)−(b2−b1).

Figure 8A:
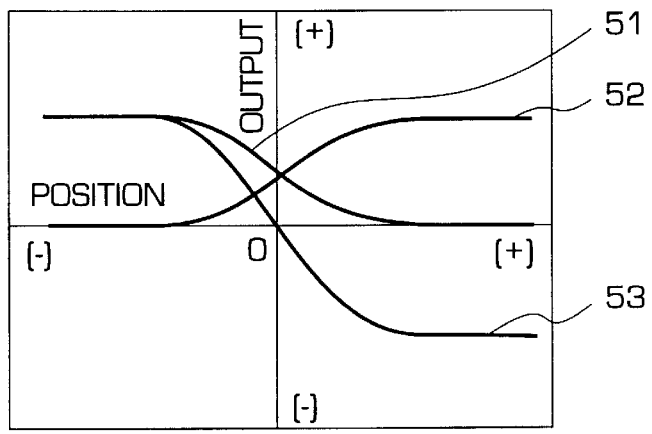
FIGS. 8A to 8C are graphs showing variations in the output signals generated from the signal processing circuit shown in FIG. 7.
Figure 8B:
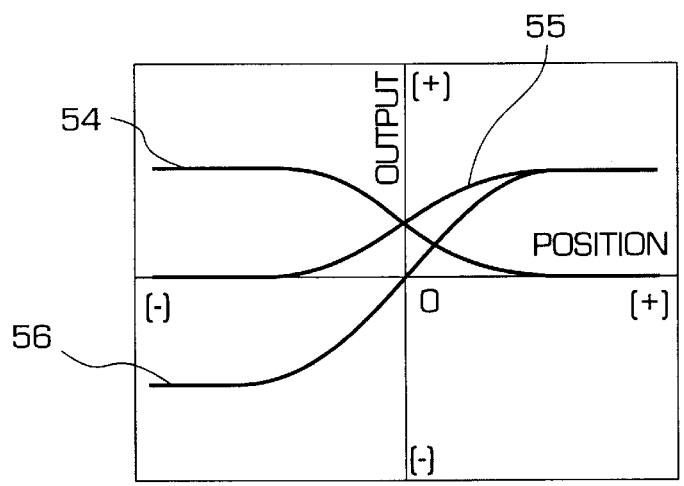
Figure 8C:
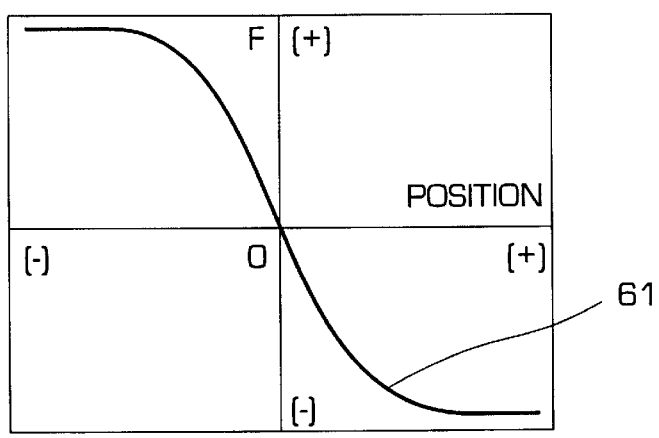

As described above, the two-split sensors 16 and 17 are arranged at the same optical inclination before and after the position 18 at which the return beam of optical beam 13 for the focal point detection is converged by condenser lens 15 when the focal point of objective lens 11 is positioned on surface 12 of the target object. FIGS. 8A to 8B show variations of the output signals from the differential amplification circuits 43, 44 and 45 as surface 12 of the target object is moved along the direction of the optical axis of objective lens 11. In the graph of FIGS. 8A to 8C, the abscissa denotes a position of objective lens 11 relative to the focal point of objective lens 11. The larger the position from the origin becomes in the negative direction, the farther the surface 12 of the target object is positioned from the focal point of the objective lens 11. On the other hand, the larger the position from the origin becomes in the positive direction, the closer surface 12 of the target object is positioned to objective lens 11 than the focal point of objective lens 11.

A curve 51 in FIG. 8A denotes the output signal a1 from the light receiving section A1 shown in FIG. 7. A curve 52 in FIG. 8A denotes the output signal a2 from the light receiving section A2. A curve 53 denotes a difference signal a1−a2 of the output signals from the two light receiving sections A1, A2, i.e., the output signal Fa mentioned earlier. Similarly, a curve 54 in FIG. 8B denotes the output signal b1 from the light receiving section B1 shown in FIG. 7, a curve 55 in FIG. 8B the output signal b2 from the light receiving section B2, and a curve 56 a difference signal b2−b1 of the output signals from the two light receiving sections B2, B1, i.e., the output signal Fb mentioned earlier. In FIG. 8C, a curve 61 shows a difference signal F which represents the difference between the output signals Fa and Fb from the differential amplification circuits 43 and 44, forming a focus signal. As seen from FIG. 8C, when the focal point of objective lens 11 deviates from surface 12 of the target object, the focal point of objective lens 11 can be constantly positioned on surface 12 of the target object whereby objective lens 11 is moved along the direction of the optical axis such that the focus signal F has a value under the state being in focus (i.e., 0 in this embodiment).

As discussed above, the first and second two-split sensors 16 and 17 are arranged at the same optical inclination in the present invention. This makes it possible to obtain a satisfactory focus signal even when surface 12 of the target object has a locally different reflectance due to a chromium pattern formed on a glass substrate, e.g., a mask pattern used in the manufacture of a semiconductor device, or when surface 12 has a locally different reflectance due to asperities formed on the target object, e.g., a wafer coated with resist and exposed to light selectively in a pattern.

Explanation will be presented below regarding the behavior of the return beam of the optical beam for the focal point detection on the two-split sensor and the focus signal to be detected in a case where the surface of the target object has a locally different reflectance.

Figure 9A:
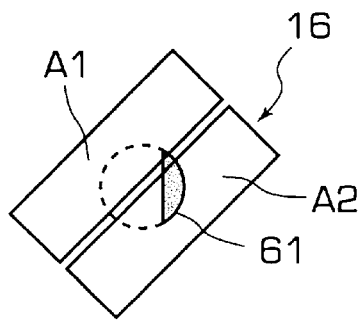
FIGS. 9A, 9B, 10A, 10B, 11A and 11B schematically show the states of the return beam of an optical beam for the focal point detection on the two-split sensors in the focal point detecting apparatus shown in FIG. 4, when the surface of the target object has a locally different reflectance.
Figure 9B:
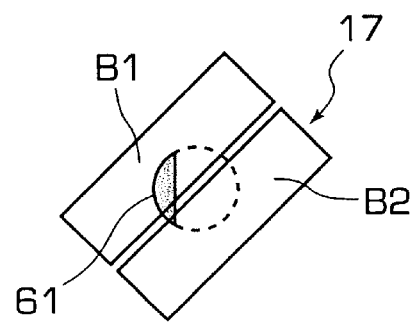
Figure 10A:
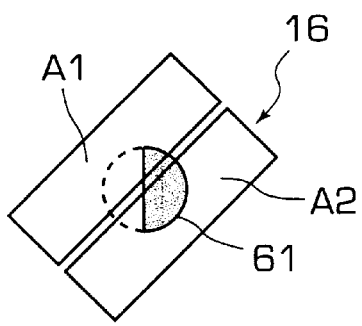
Figure 10B:
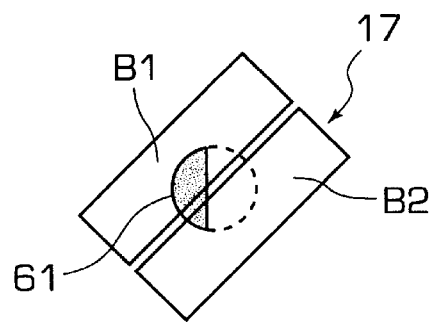
Figure 11A:
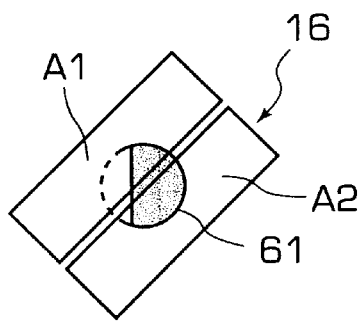
Figure 11B:
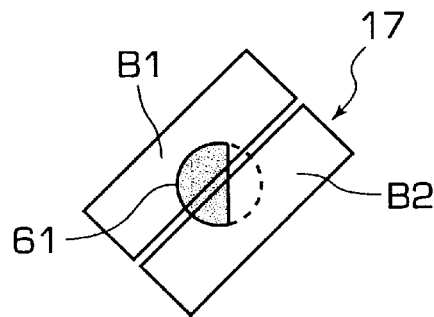
Figure 12A:
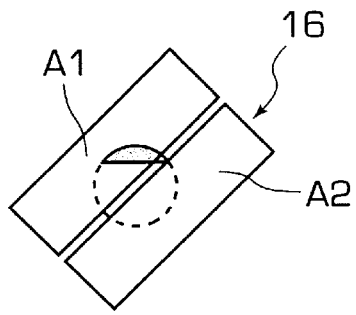
FIGS. 12A, 12B, 13A, 13B, 14A and 14B schematically show the states of the return beam of an optical beam for the focal point detection on the two-split sensors in the focal point detecting apparatus shown in FIG. 4, when the surface of the target object has a locally different reflectance.
Figure 12B:
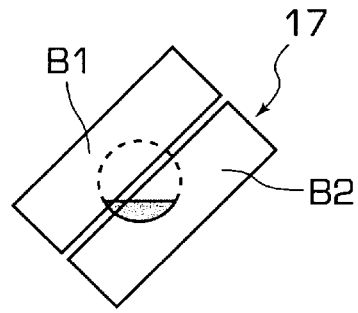
Figure 13A:
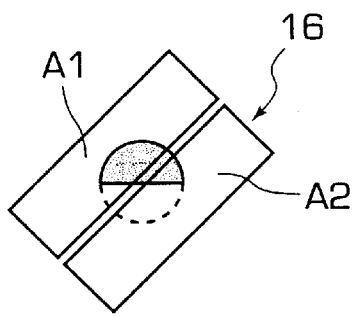
Figure 13B:
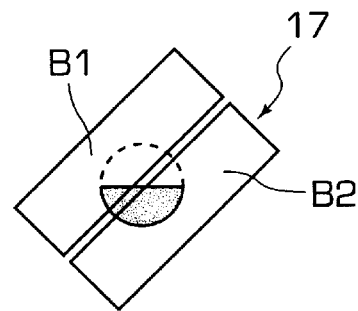
Figure 14A:
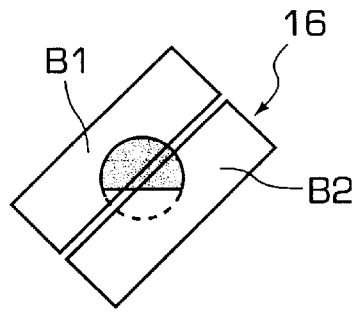
Figure 14B:
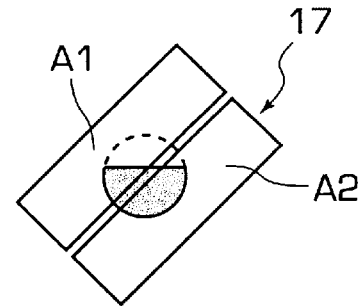

FIGS. 9A, 10A and 11A show a case where the return beam 61 forms a vertical pattern on two-split sensor 16 because the surface of the target object has a different reflectance due to the location or the presence of asperities. In this case, patterns reverse by 180° from the patterns of the return beam 61 shown in FIGS. 9A, 10A and 11A are obtained on two-split sensor 17, as shown in FIGS. 9B, 10B and 11B, respectively. Further, each of FIGS. 12A, 13A and 14A shows a case where the return beam 61 forms a lateral pattern on two-split sensor 16. In this case, patterns inverted by 180° from the patterns of return beam 61 shown in FIGS. 12A, 13A and 14A are obtained on two-split sensor 17, as shown in FIGS. 12B, 13B and 14B, respectively.

Figure 15A:
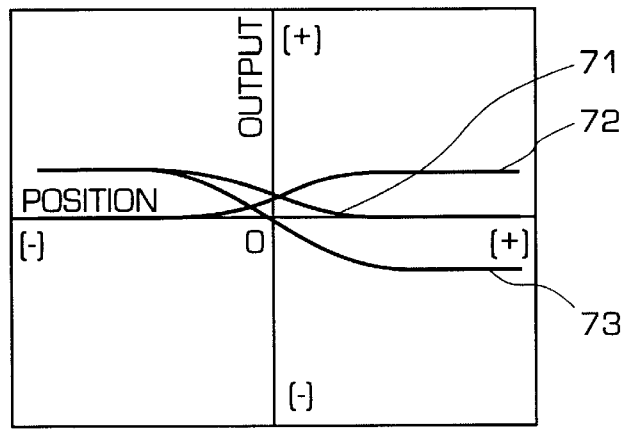
FIGS. 15A to 15C are graphs showing the output signals generated from the signal processing circuit shown in FIG. 7, when the surface of the target object has a locally different reflectance.
Figure 15B:
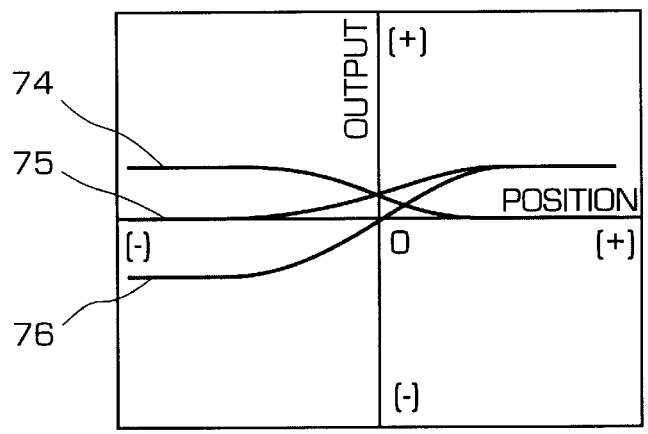
Figure 15C:
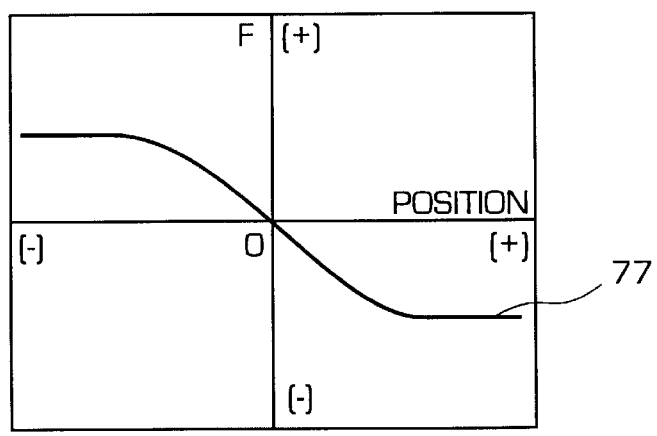

When the return beam onto each of the two-split sensors 16 and 17 is in the state as shown in FIGS. 10A and 10B, the output signals from the differential amplification circuits 43, 44, 45 shown in FIGS. 15A to 15C are obtained. The abscissa of the graph shown in each of FIGS. 15A to 15C is the same as that described previously in conjunction with FIGS. 8A to 8C.

In FIG. 15A, a curve 71 represents the output signal a1 from the light receiving section A1, curve 72 represents the output signal a2 from the light receiving section A2, and curve 73 represents the output signal Fa from the differential amplification circuit 43 in FIG. 7B, which is equal to a1−a2, respectively. Similarly, in FIG. 15B, curves 74 and 75 represent the output signals b1 and b2 from the light receiving sections B1 and B2 shown in FIG. 7, respectively, and a curve 76 the output signal Fb from the signal processing circuit 44 shown in FIG. 7, which is equal to b2−b1. Further, in FIG. 15c, a curve 77 represents the difference signal F, which is equal to the difference between the output signals Fa from the signal processing circuit 43 and the output signal Fb from the signal processing circuit 44 shown in FIG. 7. The difference signal F forms a focus signal under the states shown in FIGS. 10A and 10B. In this way, a satisfactory focus signal can be obtained even when the surface of the target object has a different reflectance due to the location or asperities on the surface of the target object.

Another embodiment of the present invention will be described bellow.

In the focal point detecting apparatus configured above, the first and second two-split sensors 16 and 17 are arranged before and after light converging point 18 at which the return beam of optical beam 13 for the focal point detection is converged by condenser lens 15 when the focal point of objective lens 11 is positioned on surface 12 of the target object. At this time, if first and second two-split sensors 16 and 17 are located in the direction of the optical axis of the objective lens 11, then the return beam of optical beam 13 for the focal point detection will be intercepted by the first two-split sensor 16 arranged in front of light converging position 18, with the result that the return beam fails to be converged on second two-split sensor 17 arranged behind light converging position 18. However, in FIGS. 4 and 5, these two-split sensors 16 and 17 are arranged side by side in the direction of the optical axis of objective lens 11 for the brevity of the description. For this reason, a preferred arrangement of the first and second two-split sensors suitable for implementing the present invention will be explained with reference to FIG. 16.

Figure 16:
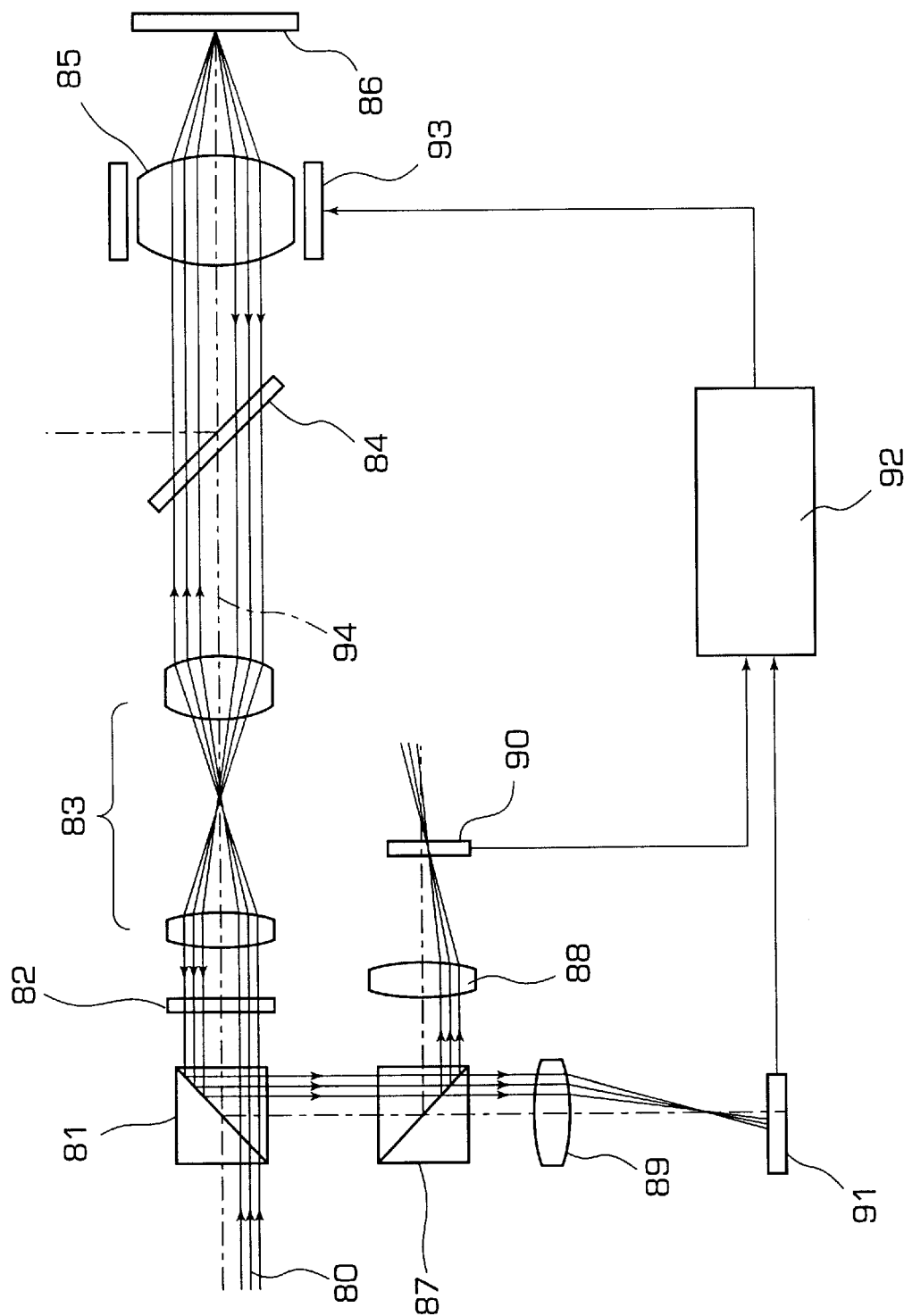
FIG. 16 schematically shows an optical system of a focal point detection apparatus according to another embodiment of the present invention.

In the focal point detection apparatus shown in FIG. 16, an optical beam 80 for detecting the focal point, which runs toward a surface 86 of the target object, is polarized. Optical beam 80 does not coincide, but is substantially parallel with an optical axis 94 of the optical system requiring the focal point detection, and transmits through a polarized beam splitter 81. The optical beam passing through polarized beam splitter 81 transmits through a ¼ wave plate 82, with a linearly polarized light being converted into a circularly polarized light. The circularly polarized light then passes through a relay lens 83. Relay lens 83 has two-group configuration to converge lights at one time, allowing the focal adjustment and the width of optical beam 80 to be altered as required. The optical beam that has passed through relay lens 83 is transmitted through a dichroic mirror 84, and then is converged in the vicinity of surface 86 of the target object through an objective lens 85.

Thereafter, the optical beam (return beam) reflected from surface 86 of the target object enters again into objective lens 85, successively passes through dichroic mirror 84, relay lens 83 and ¼ wave plate 82. At this time, the return beam is converted by means of ¼ wave plate 82 into a linearly polarized light differing by 90° from the initial polarization direction at the time when optical beam 80 entered polarized beam splitter 81. As a result, the return beam that has passed through ¼ wave plate 82 is efficiently reflected from polarized beam splitter 81 which the return beam enters next time.

The return beam reflected from polarized beam splitter 81 is branched into two directions by a beam splitter 87. One branched return beams is converged by a condenser lens 88, and the other branched return beam is converged by another condenser lens 89. The return beam that has passed through condenser lens 88 enters a two-split sensor 90. Two-split sensor 90 is positioned in front of a position where the return beam is converged by condenser lens 88 at the time when the focal point of objective lens 85 is positioned on surface 86 of the target object. On the other hand, the return beam passing through condenser lens 89 enters a two-split sensor 91. Two-split sensor 91 is positioned behind a position where the return beam is converged by condenser lens 89 at the time when the focal point of objective lens 85 is positioned on surface 86 of the target object. Signals obtained from these two-split sensors 90 and 91 are processed at a signal processing circuit 92 in the same way as described previously in conjunction with the signal processing circuit shown in FIG. 7.

With the apparatus shown in FIG. 16, it is also possible to obtain a satisfactory focus signal as shown in FIG. 8C or FIG. 15C when surface 86 of the target object is moved in the direction of the optical axis of objective lens 85. Based on the focus signal, objective lens 85 is moved by a lens driving device 93 to allow the focal point of objective lens 85 to be positioned on surface 86 of the target object. That is, lens driving device 93 moves objective lens 85 such that the focus signal F obtained from signal processing circuit 92 has a value (i.e., zero in this embodiment) under the state of being in focus, whereby the focal point of objective lens 85 can be constantly positioned on surface 86 of the target object. Lens driving device 93 may be employed, for example, as a piezo element.

The signal processing for obtaining a focus signal has been described in conjunction with FIG. 7. However, the detecting accuracy can be further improved by normalization by the entire light amount of the received light as: Fa=(a1−a2)/(a1+a2), Fb=(b2−b1)/(b1+b2), F=Fa−Fb.

It is to be noted that, if the focal point detecting apparatus shown in FIG. 16 is applied to an electron microscope, an optical inspecting apparatus, a laser processing apparatus, etc., an optical beam for the inspection, processing, etc. may be entered objective lens 85 through dichroic mirror 84.

While preferred embodiments of the present invention have been described using specific terms, such description is for illustrative purpose only, and it is to be understood that changes and variations may be made without departing from the spirit or scope of the following claims.

What is claimed is:

1. A focal point detecting apparatus, comprising:
    an objective lens;
    means for projecting an optical beam through said objective lens, from a position deviant from an optical axis of said objective lens, toward a surface of a target object to be inspected;
    a condenser lens for converging the optical beam reflected from said surface of the target object and passed again through said objective lens into said condenser lens; and
    two two-split sensors arranged at the same optical inclination before and after a position on which the reflected optical beam is converged by said condenser lens when the focal point of said objective lens is positioned on the surface of the target object.

2. The focal point detecting apparatus according to claim 1, wherein each of said two two-split sensors includes two light receiving sections, and a boundary line between said two light receiving sections of each two-split sensor makes an angle of about 45° relative to a direction in which the optical beam is moved on the two-split sensor when the surface of the target object is moved in a direction parallel to the optical axis of the objective lens.

3. The focal point detecting apparatus according to claim 2, wherein said two light receiving sections constituting each of the two two-split sensors are shaped in symmetry with respect to said boundary line.

4. The focal point detecting apparatus according to claim 3, further comprising a signal processing circuit including a first differential amplifier for producing an output signal a1−a2, a second differential amplifier for producing an output signal b2−b1, and a third differential amplifier for producing an output signal F=(a1−a2)−(b2−b1), where a1,a2 represent output signals from two light receiving section making up one two-split sensor, and b1,b2 represent output signal from two light receiving sections making up the other two-split sensor.

5. The focal point detecting apparatus according to claim 4, further comprising a lens drive for moving the objective lens so as to enable the focal point of the objective lens to be positioned on the surface of the target object, based on said output signal F.

6. A focal point detecting apparatus, comprising:

an objective lens;

means for projecting an optical beam from a position deviant from an optical axis of said objective lens, toward a surface of a target object to be inspected through at least said objective lens;

branching means for branching the optical beam reflected from said surface of the target object and passed again through said objective lens into two directions;

a first condenser lens for converging one optical beam branched by said branching means;

a second condenser lens for converging the other optical beam branched by the branching means;

a first two-split sensor, arranged before a position on which said one optical beam branched by said branching means is converged by said first condenser lens when the focal point of the objective lens is positioned on the surface of the target object; and a second two-split sensor, arranged after a position on which said other optical beam branched by said branching means is converged by said second condenser lens when the focal point of the objective lens is positioned on the surface of the target object.

7. The focal point detecting apparatus according to claim 6, wherein each of said first and second two-split sensors includes two light receiving sections, and a boundary line between said two light receiving sections of each two-split sensor makes an angle of about 45° relative to a direction in which the optical beam is moved on each two-split sensor when the surface of the target object is moved in a direction parallel to the optical axis of the objective lens.

8. The focal point detecting apparatus according to claim 7, wherein said two light receiving sections constituting each of the first and second two-split sensors are shaped in symmetry with respect to said boundary line.

9. The focal point detecting apparatus according to claim 8, further comprising a signal processing circuit including a first differential amplifier for producing an output signal a1−a2, a second differential amplifier for producing an output signal b2−b1, and a third differential amplifier for producing an output signal F=(a1−a2)−(b2−b1), where a1,a2 represent output signals from two light receiving section making up one two-split sensor, and b1,b2 represent output signal from two light receiving sections making up the other two-split sensor.

10. The focal point detecting apparatus according to claim 9, further comprising a lens drive for moving the objective lens so as to enable the focal point of the objective lens to be positioned on the surface of the target object, based on said output signal F.

\* \* \* \* \*